(12) United States Patent
Matsuo

(10) Patent No.: US 6,281,657 B1
(45) Date of Patent: Aug. 28, 2001

(54) IMAGE DETECTING APPARATUS AND METHOD

(75) Inventor: Yuichiro Matsuo, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/527,841

(22) Filed: Mar. 17, 2000

(30) Foreign Application Priority Data

Mar. 24, 1999 (JP) ................................................. 11-080023

(51) Int. Cl.[7] .................................................... H02P 3/18
(52) U.S. Cl. .......................... 318/705; 318/661; 388/842; 359/369; 382/181
(58) Field of Search .................................. 318/705, 661, 318/602; 350/369; 382/181; 388/842

(56) References Cited

U.S. PATENT DOCUMENTS

| 4,136,950 | * | 1/1979 | Labrum et al. | 356/28 |
|---|---|---|---|---|
| 4,558,304 | * | 12/1985 | Wand | 340/347 SY |
| 4,737,640 | * | 4/1988 | Ohashi | 250/311 |
| 4,989,078 | * | 1/1991 | Paxton | 358/88 |
| 5,073,857 | * | 12/1991 | Peters et al. | 364/413.1 |
| 5,206,677 | * | 4/1993 | Onuki et al. | 354/400 |
| 5,254,915 | * | 10/1993 | Komatsu et al. | 318/369 |
| 5,387,960 | * | 2/1995 | Hirasawa et al. | 354/402 |
| 5,583,603 | * | 12/1996 | Hirasawa et al. | 396/135 |
| 5,633,672 | * | 5/1997 | Lungerhausen et al. | 347/234 |

FOREIGN PATENT DOCUMENTS

| 7-250492 | 9/1995 | (JP) . |
|---|---|---|
| 9-297267 | 11/1997 | (JP) . |

* cited by examiner

Primary Examiner—Paul Ip
Assistant Examiner—Rita Leykin
(74) Attorney, Agent, or Firm—Frishauf, Holtz, Goodman, Langer & Chick, P.C.

(57) ABSTRACT

An image detecting apparatus comprises a rotating disk having pinholes that allow light to pass through, a photosensor for detecting the rotation of the disk, a CCD camera for capturing a confocal image of a specimen passed through the pinholes of the disk, a brushless DC motor for rotating the disk at a given speed, and an FPGA which produces a pulse-like brake signal having two levels for accelerating and decelerating the disk and its pulse width set variable and outputs it to the DC motor, thereby allowing the synchronization of the rotation of the disk with the image capture timing of the CCD camera.

17 Claims, 14 Drawing Sheets

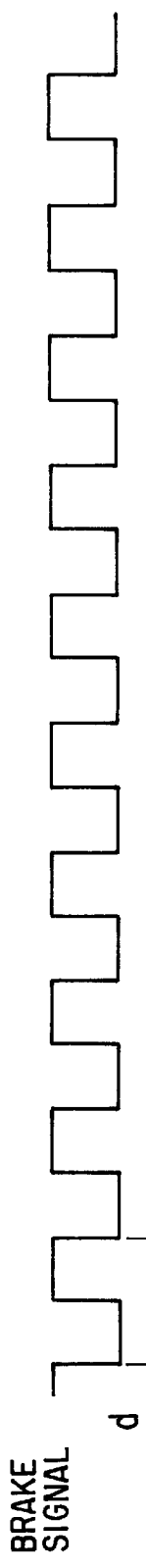
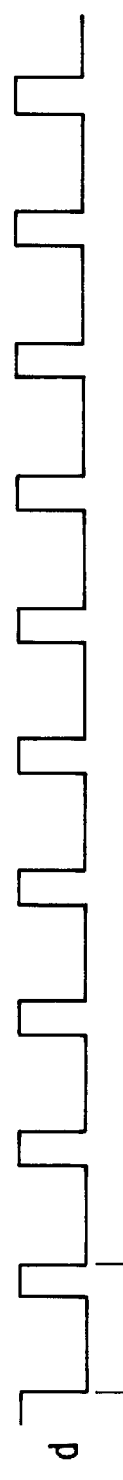
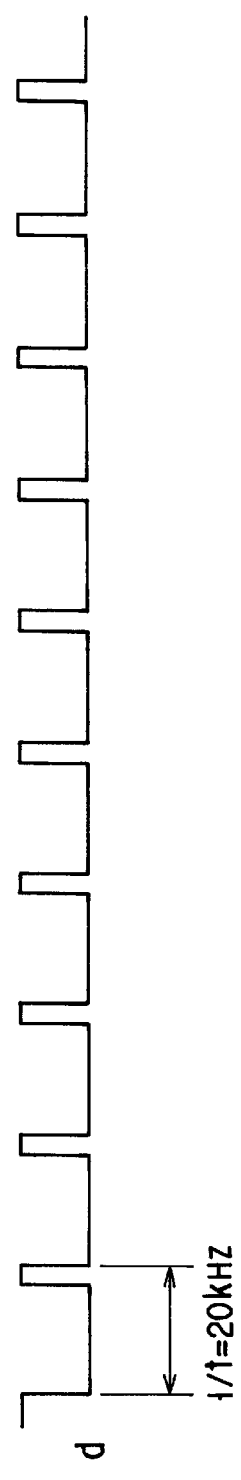
FIG. 9A
FIG. 9B
FIG. 9C

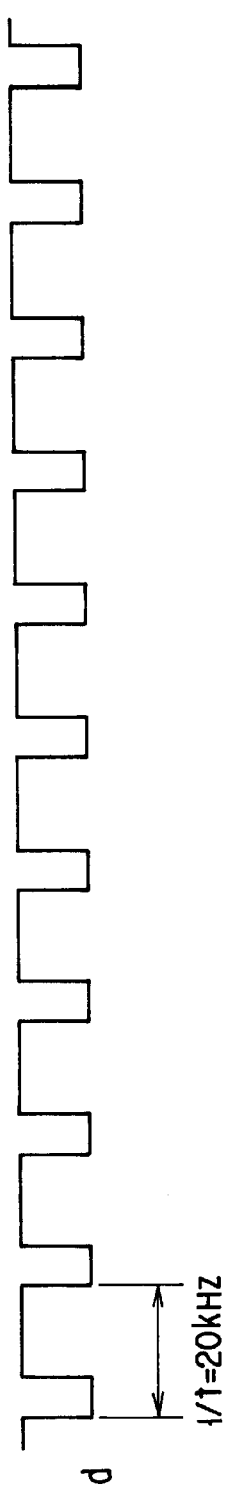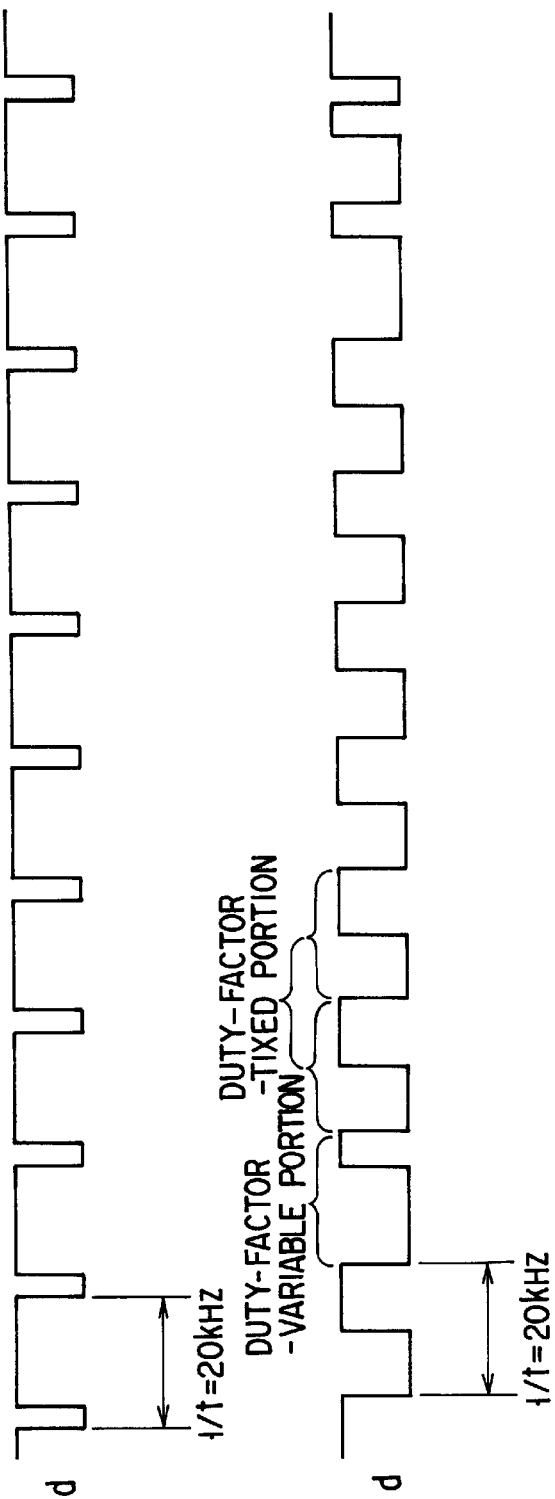
FIG. 9D
FIG. 9E
FIG. 9F

| SIGNAL SYSTEM | SIGNAL c | BRAKE SIGNAL d |
|---|---|---|
| NTSC | 29.97Hz | 20KHZ |
| PAL | 25.00Hz | 15KHZ |

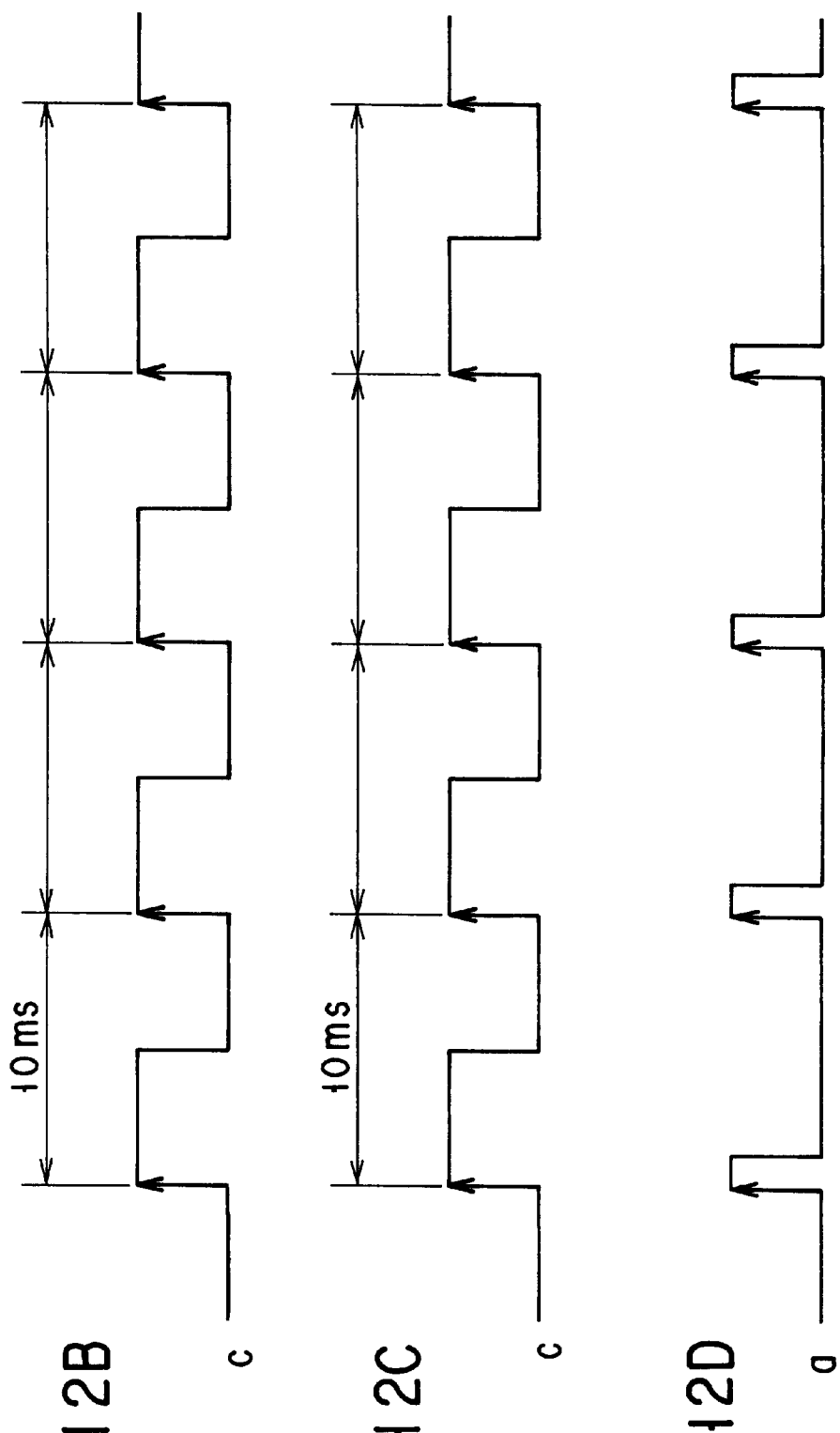

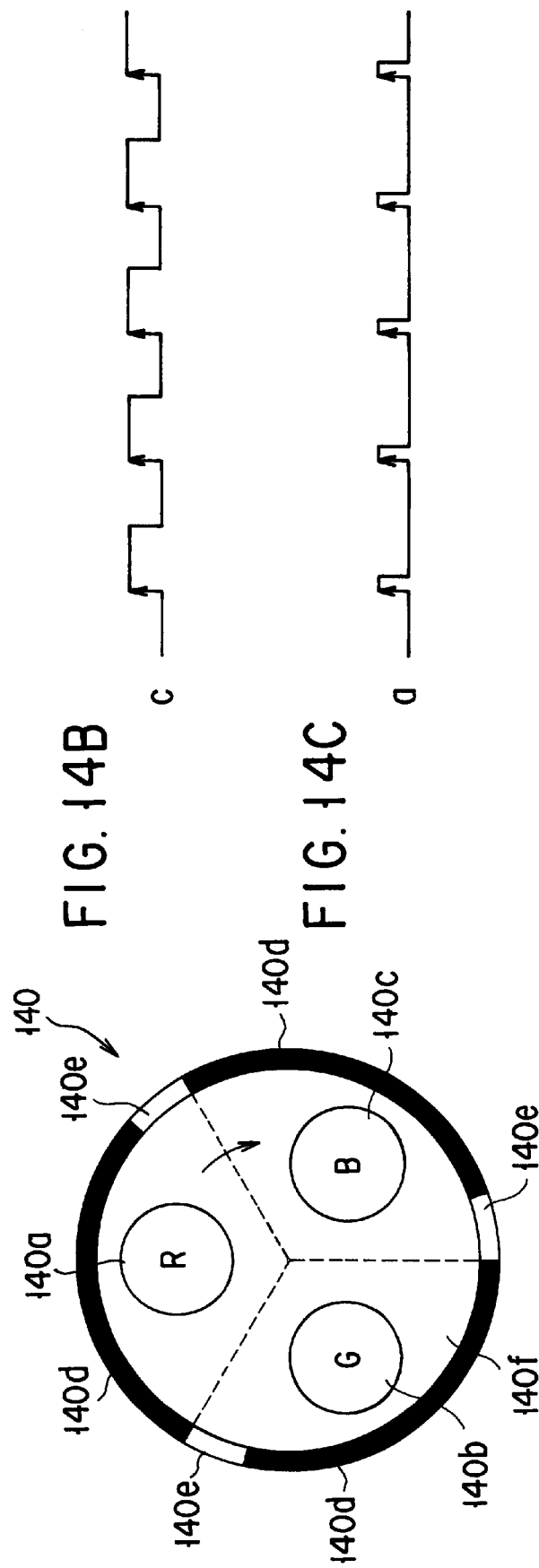

IMAGE DETECTING APPARATUS AND METHOD

CROSS-REFERENCE TO RELATED APPLICATIONS

This application is based upon and claims the benefit of priority from the prior Japanese Patent Application No. 11-080023, filed Mar. 24, 1999, the entire contents of which are incorporated herein by reference.

BACKGROUND OF THE INVENTION

The present invention relates to an image detecting apparatus and method used to observe and measure the shape of microstructures or three-dimensional structures of specimens.

Conventionally, confocal microscopes have been used as image detecting apparatus. A typical confocal microscope is one that uses a disk having a large number of pinholes arranged in the form of spirals, i.e., a Nipkow disk. In such a confocal microscope, in order to produce a confocal image of a specimen, it is scanned with a beam of light by rotating the Nipkow disk. If, when the confocal image of the specimen is captured by a CCD camera or the like, scanning of the specimen by the disk and image capture by the camera are not properly synchronized with each other, then light and dark bars may be produced on captured images.

To solve such a problem, a method has been proposed which synchronizes the disk rotation with the CCD camera using a video signal from the camera as disclosed in Japanese Unexamined Patent Publication No. 9-297267.

Most of the conventional apparatuses use a brushless DC motor that is comparatively inexpensive and easy to use. Usually, the speed control of such a brushless DC motor is performed by controlling the magnitude of a motor drive signal input to a motor driver and thereby changing the magnitude of current in the motor stator coil. As the magnitude of the drive signal increase, the motor speed increases with increasing motor stator coil current and vice versa.

As an invention regarding control of motor stator coil current for motor speed control, there is a motor control device as disclosed in Japanese Unexamined Patent Publication No. 7-250492.

FIG. 1 shows the arrangement of such a device. A brushless DC motor (hereinafter referred to simply as a motor) 111 is provided with delta-connected stator coils 112a, 112b and 112c and a rotor 113 formed with four magnetic poles. Hole elements 114a, 114b and 114c are placed opposite to the motor stator coils 112a, 112b and 112c, respectively. Hall signals E1, E2 and E3 are output from the Hall elements 114a, 114b and 114c, respectively. Each of the Hall signals is inverted every 180 degrees with movement of the magnetic poles of the rotor 113 past the corresponding Hall element. The Hall signals are displaced in phase with respect to one another by 60 degrees.

A motor controller 115 comprises a digital signal processor. The motor controller has a sinusoidal amplitude control section 116 for controlling the motor 111 in the steady state after start. The control section, in conjunction with a timing generator 117 provided as an external circuit, controls the amplitude of a sinusoidal signal for keeping the motor at a specified speed on the basis of the Hall signals from the Hall elements 114a to 114c DA converters 118a, 118b and 118c are connected to the motor controller 115, which convert three-phase sinusoidal amplitude digital data having a phase deviation of 60 degrees output from the control section 116 into analog signals.

The DA converters 118a, 118b and 118c are connected to separation circuits 119a, 119b, and 119c, respectively, which separate sinusoidal signals E16, E17 and E18 from the respective DA converters into drive signals. The driving signals are signals for driving pairs of switching elements of opposite driving polarity provided in a driver circuit 120. The driver circuit is provided with three series circuits, each of a P-channel FET and an N-channel FET, in correspondence with the stator coils 112a, 112b and 112c of the DC motor 111. A switching circuit 121 is equipped with six analog switches 121a to 121f. The switching circuit 121 is connected at its terminals a to the separation circuits 119a to 119c and at its terminals b to a starting controller 122. The switching circuit 121 has its respective switches placed to the b position at the start of the motor by the motor controller 115, applying drive signals from the start controller 122 to the driver circuit 120.

When the motor reaches a specified speed as a result of the start control by the start controller 122, a speed lock signal is obtained from that controller. In response to the speed lock signal, the motor controller 115 moves the switches in the switching circuit 121 to a position. As a result, the drive signals are applied from the separation circuits 119a to 119c to the driver circuit 120.

The start controller 122 is provided with a rectangular-pulse amplitude control section 123, which, in response to the Hall signals E1 to E3 from the Hall elements 114a to 114c, controls the amplitude of rectangular pulses to obtain the specified motor rotation. The amplitude gain of the rectangular pulse signals is controlled so that the difference between the actual rotation detected via the Hall signals and the predetermined reference rotation based on a reference clock becomes zero.

The sinusoidal amplitude control section 116 itself in the motor controller 115 provides no control gain. A drive signal E11 output from the start controller 122 and having its amplitude gain controlled according to the Hall elements 114a to 114c is fed through an AD converter 124 into the motor controller 115. The sinusoidal amplitude control section 116 considers the amplitude of the drive signal E11 to be the control gain for the motor 111 and determines the amplitudes of sinusoidal signals.

Thus, the speed of the brushless DC motor is changed by changing the motor stator currents in analog fashion. Thereby, the motor is allowed to rotate at a target speed.

However, trying to implement the motor speed control by changing the motor stator currents inevitably results in the need of analog circuits. Even if a high-speed digital signal processor is used to detect the difference between specified speed and current speed and to produce digital drive signals, it becomes necessary to change the motor stator coil currents in analog manner in the final stage. Thus, analog circuits, such as DA converters, become necessary. Usually, the motor driver circuit is susceptible to strong noise that arises from the brushless DC motor itself and various components. Analog signals are easy to be distorted by noise. Control of currents in the stator coils of the brushless DC motor by distorted analog signals results in failure to cause desired currents to flow in the stator coils, making the rotation of the DC motor unstable.

Reducing the stator coil currents in the brushless DC motor allows the rotating speed of the motor to be reduced; however, at the same time, the rotation torque will also be reduced. Thus, there arises a problem that the number of rotations of the DC motor varies greatly with varying torque.

BRIEF SUMMARY OF THE INVENTION

It is an object of the present invention to provide an image detecting apparatus which is noise-resistant and permits the rotation speed of a motor to be regulated against variations in torque.

It is another object of the present invention to provide an image detecting method which is noise-resistant and permits the rotation speed of a motor to be regulated against variations in torque.

According to an aspect of the present invention there is provided an image detecting apparatus comprising: a rotating body having a light-transmission pattern; rotating state detecting mechanism producing a signal indicative of the rotating state of the rotating body; image capture mechanism capturing an image transmitted through the light-transmission pattern and providing an image signal; a motor mounted to the rotating body for rotating the rotating body at a given speed; a motor driver for driving the motor; and a motor controller responsive to the rotating state detecting mechanism outputting, to the motor driver, a pulse-like brake signal for synchronizing the rotation of the motor with the image capture timing of the image capture mechanism, the brake signal having two levels for accelerating and decelerating the motor and its pulse width set variable.

According to another aspect of the present invention there is provided an image detecting apparatus comprising: a rotating body having a reflective pattern; rotating state detecting mechanism outputting the rotating state of the rotating body; image capture mechanism capturing an image reflected from the reflective pattern; a motor mounted to the rotating body for rotating the rotating body at a given speed; a motor driver for driving the motor; and a motor controller responsive to the rotating state detecting mechanism outputting, to the motor driver, a pulse-like brake signal for synchronizing the rotation of the motor with the image capture timing of the image capture mechanism, the brake signal having two levels for accelerating and decelerating the motor and its pulse width set variable.

The present invention eliminates the need to use analog circuits for motor speed control, allowing motor speed variations due to noise and torque variations to be suppressed.

In the present invention, the motor controller should preferably contain pulse width varying mechanism producing a pulse signal of a predetermined frequency and allowing the pulse signal to have a pulse-width-fixed portion and a pulse-width-variable portion in selected portions thereof. This allows fine motor speed control. The circuit arrangement used is allowed to be very simple and can therefore be implemented at low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 9A through 9F show brake signals d in FIG. 2;

FIG. 12B shows the signal c generated by a speed signal generating circuit;

FIGS. 12C and 12D shows a state where the rotating speed of the disk corresponds to the speed designated by the speed designator;

FIG. 14A shows a detailed structure of a RGB disk;

FIGS. 14B and 14C shows a state of synchronization; and

DETAILED DESCRIPTION OF THE INVENTION

First Embodiment

Figure 1:
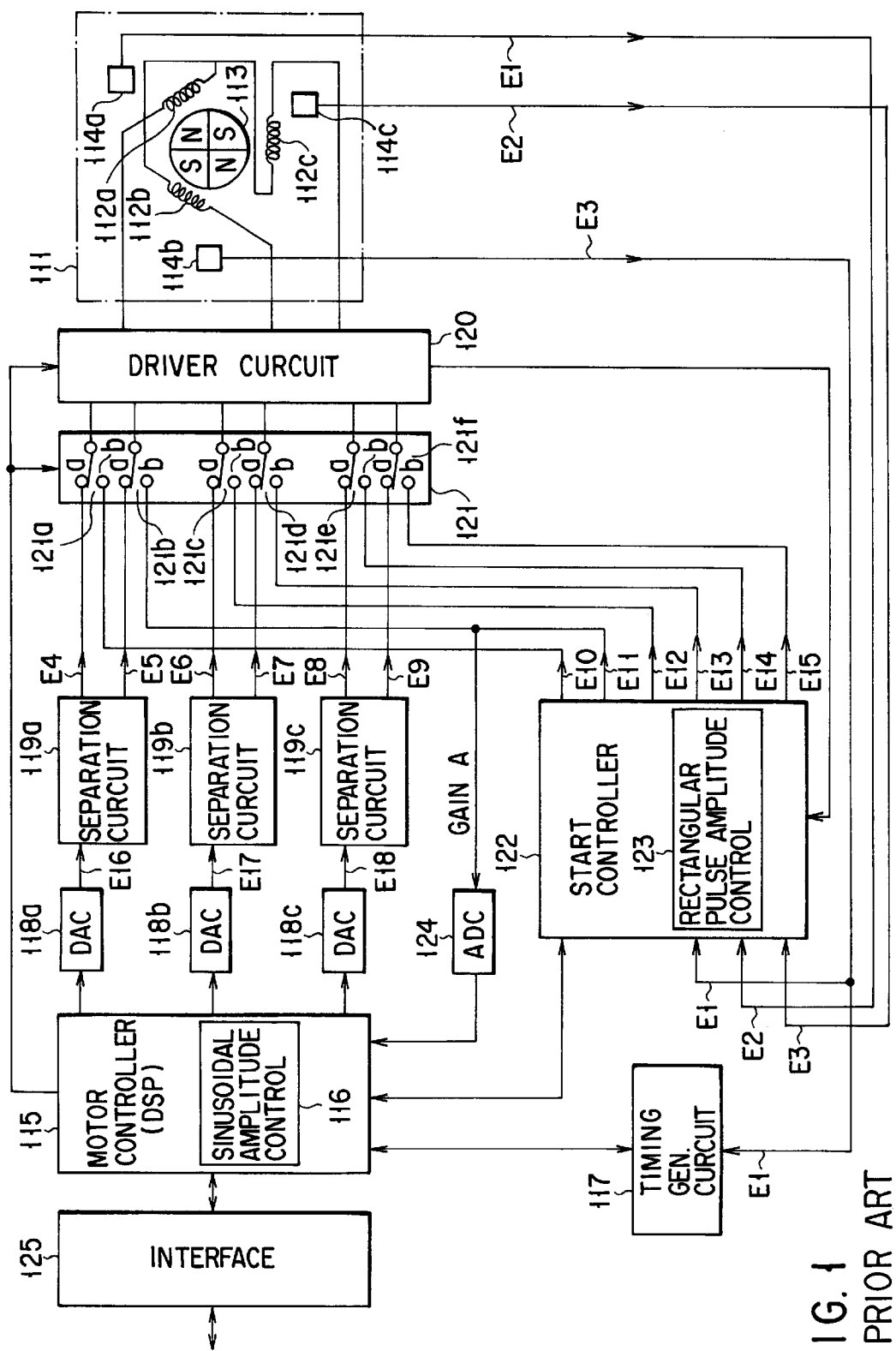
FIG. 1 is a block diagram of a conventional motor control device for use in a confocal microscope.
Figure 2:
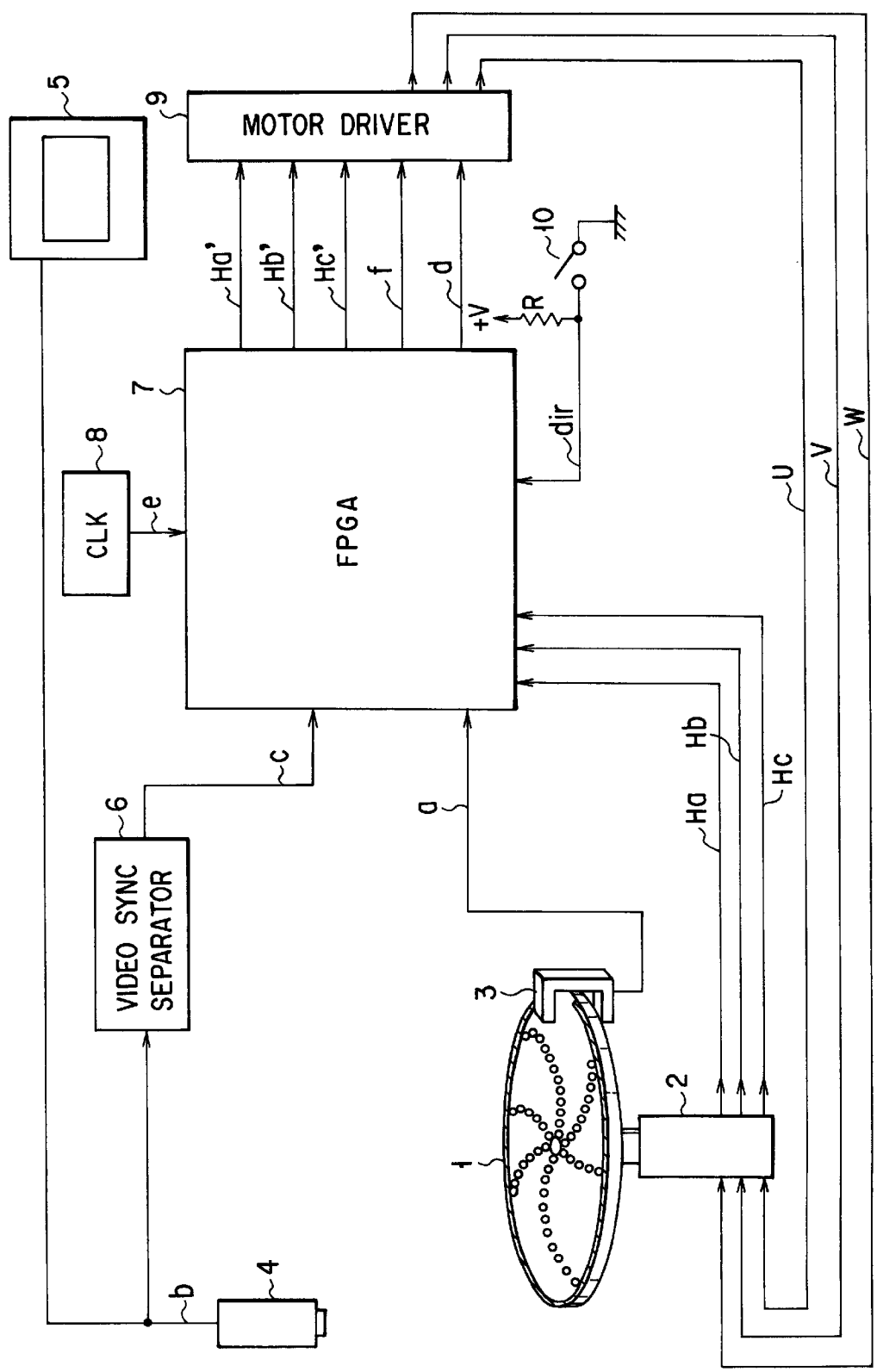
FIG. 2 is a block diagram of a motor control device for a confocal microscope according to a first embodiment of the present invention.

Referring now to FIG. 2 there is illustrated an arrangement of the image detecting device which constitutes the main part of a confocal microscope in accordance with the present invention.

As shown in FIG. 2, a pinhole disk 1 is mounted to the rotation axis of a brushless DC motor 2.

Figure 3:
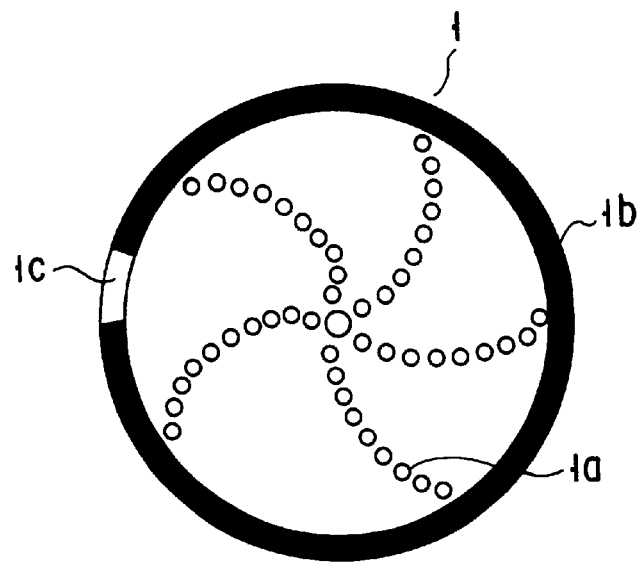
FIG. 3 is an illustration of the pinhole disk for use with the motor control device of FIG. 2.

The detailed configuration of the pinhole disk 1 is shown in FIG. 3. The disk is a Nipkow disk having a large number of pinholes 1a formed inside. These pinholes 1a are formed to spiral outwards from the center of the disk. The disk 1 is further formed at its outer edge with an light-shielding portion 1b and a light-transmission portion 1c. The pinholes 1a, the light-shielding portion 1b and the light-transmission portion 1c are formed by evaporation of chromium onto a disk substrate made of glass.

Figure 4:
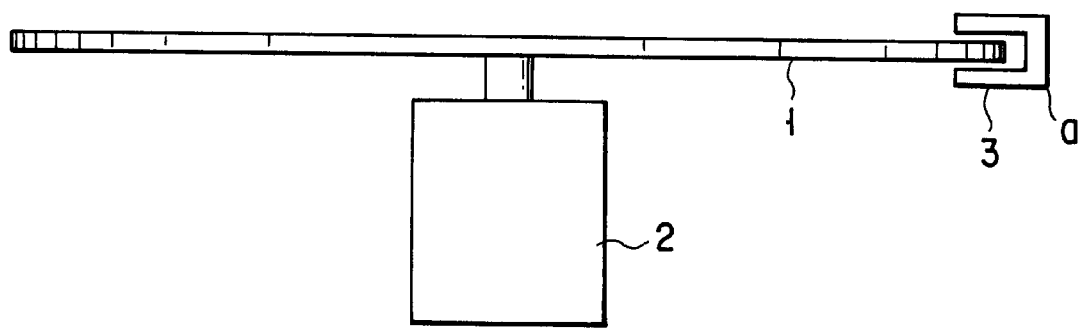
FIG. 4 shows the positional relationship of the photosensor and the pinhole disk in FIG. 2.

As shown in FIG. 2, a photosensor 3 is provided in association with the outer edge of the disk 1, which is adapted to detect the light-shielding portion 1b and the light-transmission portion 1c of the disk. The side view of the photosensor is shown in FIG. 4. The photosensor is formed in the shape of the Japanese letter " コ " and placed so that the outer edge of the disk is present between its arms. With the rotation of the disk 1, the photosensor produces a pulse-like rotation detect signal a each time the light-transmission portion 1c moves past it. This signal a is then applied to an FPGA 7.

The brushless DC motor 2, which is a three-phase four-pole motor, is driven by three-phase drive signals U, v and W. Though not shown, three Hall ICs are built in the triangular configuration into the motor to detect the rotation of the rotor and supply the FPGA 7 with Hall signals Ha, Hb and Hc which are displaced in phase from one another by 120 degrees.

An NTSC-type CCD camera 4, which is commonly used, provides a video signal b to a monitor 5 and a video sync separator 6. The video sync separator converts the video signal b into an ODD/EVEN identification signal c for identifying the odd and even fields of the video signal, which is in turn applied to the FPGA 7. In this embodiment, the signal c is set at a high level in the odd-field periods and at a low level in the even-field periods. The video sync separator 6 may be a generally used one that is inexpensive and readily available. A confocal image captured by the CCD camera 4 is displayed on the monitor 5.

Figure 5:
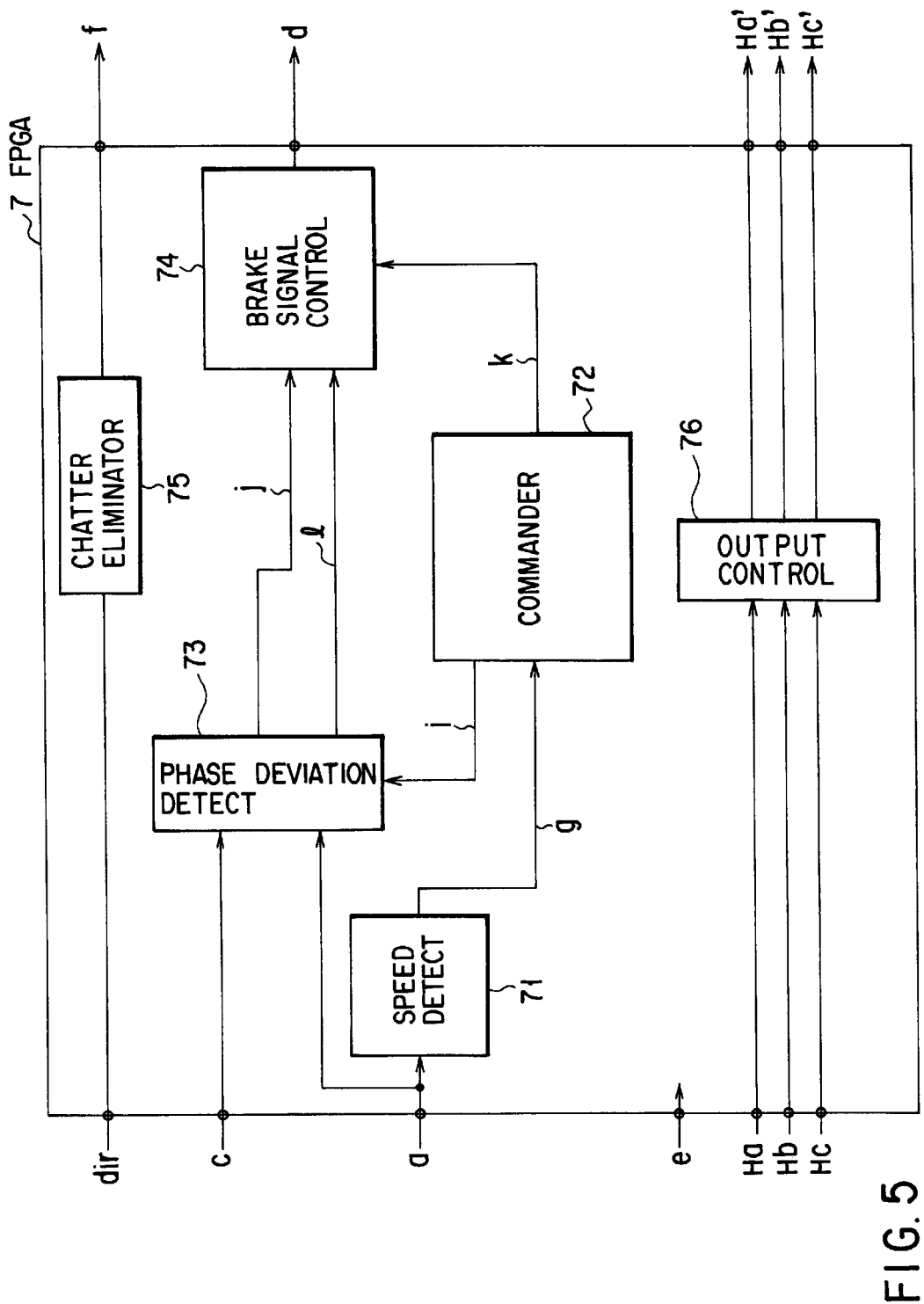
FIG. 5 is a block diagram of the FPGA of FIG. 2.

The FPGA 7 is constructed, as shown in FIG. 5, from a speed detector 71, a commander 72, a phase deviation detector 73, a brake signal controller 74, a chatter eliminator 75, and an output controller 76. The speed detector 71 supplies the commander 72 with a count g based on the detect signal a from the photosensor 3.

The commander 72 makes a comparison between the frame frequency of the video signal and the count g. As an alternative, the frame frequency may be counted by a counter (not shown) built in the phase deviation detector 73 to which the ODD/EVEN identification signal c is applied. In this case, the frame frequency value is output to the commander.

When a coincidence occurs between the count g and the frame frequency, the commander 72 recognizes that the period of rotation of the pinhole disk 1 has reached the target value and then outputs a signal k to the brake signal controller 74. The signal k tells the brake signal controller 74 to switch between brake released and controlled states on the basis of information from the speed detector 71 and the phase deviation detector 73. The commander 72 outputs an enable signal i to the phase deviation detector 73 to detect the phase relationship between the rising edges of the ODD/EVEN identification signal c from the video sync separator 6 and the rising edge of the detect signal a from the photosensor 3.

The phase deviation detector 73 outputs an acceleration/deceleration command signal j and a count signal 1 indicating the amount of phase relationship and phase deviation between the signals a and c. The acceleration/deceleration command signal j is a two-valued signal, the low level indicating deceleration and the high level indicating acceleration.

When commanded by the signal k to switch into the brake signal output mode, the brake signal controller 74 produces a brake signal d on the basis of the acceleration/deceleration command signal j and the count signal 1, and outputs it to the motor driver 9.

The chatter eliminator 75 sends a signal dir input through a direction changeover switch 10 shown in FIG. 2 to the motor driver 9 as a direction signal f. The direction changeover switch 10 is adapted to determine the direction of rotation of the brushless DC motor 2. A pull up resistor R is connected to the connection point of the direction changeover switch 10 and the FPGA 7. The resistor R is connected to supply voltage V.

The chatter eliminator 75, constructed from flip-flops and logic gates, is adapted to digitally prevent the occurrence of chatter when the switch 10 is changed over to change the direction of rotation of the DC motor.

The output controller 76 is adapted to match the phase relationship between Hall signals of the motor driver 9 and drive signals and the phase relationship between Hall signals from the brushless DC motor 2 and the drive signals. The Hall signals Ha, Hb and Hc are output to the motor driver 9 via the output controller as signals Ha', Hb' and Hc'.

The FPGA 7 operates on a clock signal "e" of, say, 3.2768 MHz generated from a clock generator 8. The components 71 to 76 of the FPGA 7 are all constructed from flip-flops and logic gates and integrated into a single semiconductor chip.

The motor driver 9 is adapted for a three-phase brushless DC motor and having input terminals connected to receive the signals Ha', Hb' and Hc' from the output controller 76. The motor driver outputs to the motor stator coils drive signals U, V and W which are appropriately phased on the basis of the phase relationship among the signals Ha', Hb' and Ha'.

The motor driver 9 is supplied at its power terminal with a rated voltage 12V for the brushless DC motor 2 through a DC-DC converter (not shown). The motor driver 9 further includes input terminals to receive the direction signal f for indicating the direction of rotation of the motor and the brake signal d. Upon receipt of the brake signal d at a low level from the FPGA 8, the motor driver 9 allows the drive signals U, V and W of the DC motor 2 to go low, thereby reducing the rotation speed of the motor 2. These drive signals are allowed to be at the low level during the interval when the brake signal d is at the low level.

The operation of the embodiment thus arranged will be described next.

When the power is applied to the system, the clock generator 8 starts oscillation at 3.2768 MHz and applies a clock signal e to the FPGA 7. The CCD camera 4 starts to capture an image of a specimen (not shown) passed through the pinholes 1a of the pinhole disk 1 with the result that a video signal b is output to the monitor 5 and the video sync separator 6. The video sync separator converts the video signal b into an ODD/EVEN identification signal c which, in turn, is applied to the FPGA 7.

Figure 6:
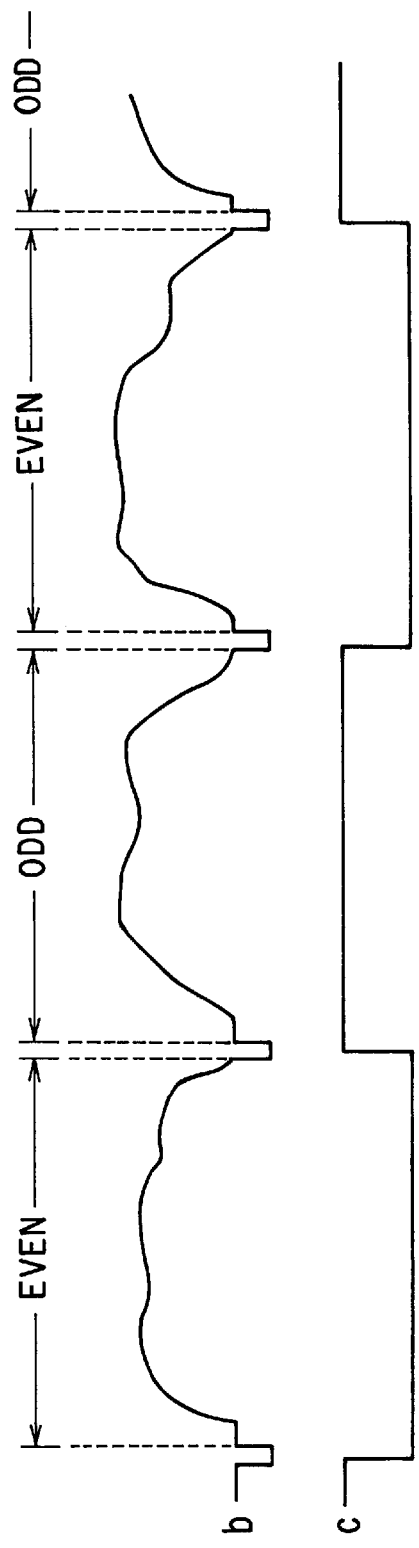
FIG. 6 shows a relationship between the video signal b and the ODD/EVEN identification signal c in FIG. 2.

The relationship between the video signal b and the ODD/EVEN identification signal c is illustrated in FIG. 6. As shown, the video signal b alternates between even fields and odd fields. The ODD/EVEN identification signal goes to the high level at the beginning of an odd field, more accurately, at the midpoint of the vertical retrace period immediately after an even field and goes to the low level at the beginning of an even field, more accurately, at the midpoint of the vertical retrace period immediately after an odd field.

The FPGA 7 outputs the Hall signals Ha, Hb and Hc from the DC motor 2 through the output controller 76 to the motor driver 9 as Ha', Hb' and Hc'. Moreover, the FPGA 7 sends a dir signal that specifies the direction of rotation of the motor through the chatter eliminator 75 to the motor driver 9 as a direction signal f. Furthermore, the FPGA 7 outputs a brake signal d to the motor driver 9. At this point, the commander 72 instructs the brake signal controller 74 via a signal k to make the brake signal d go high. As a result, the brushless DC motor 2 is placed in the brake released state and accelerated at full power.

When the brushless DC motor 2 starts rotation, the light-shielding portion 1b and the light-transmission portion 1c of the disk 1 move past the photosensor 3. When the light-shielding portion 1b is moving past the photosensor 3, a signal a at a low level is output from the photosensor 3. On the other hand, when the light-transmission portion 1c moves past the photosensor 3, the signal a goes high.

Figure 7:
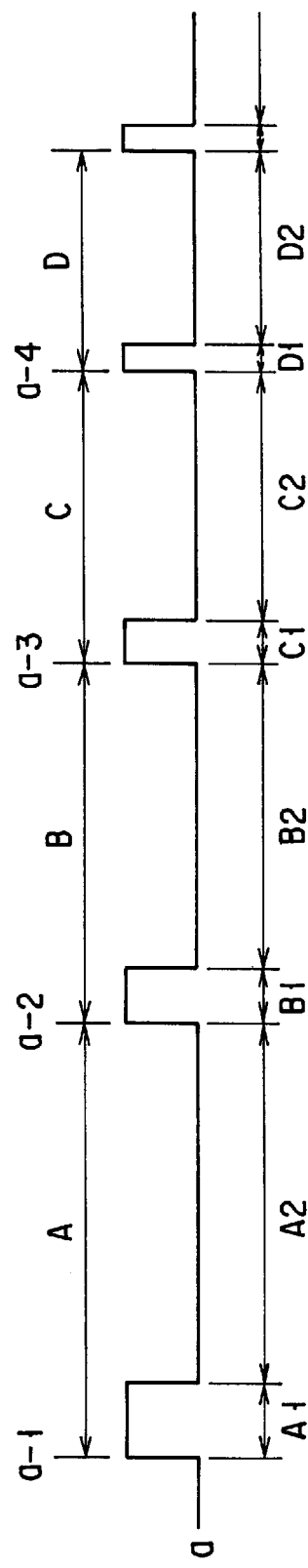
FIG. 7 is a diagram for use in explanation of the operation of the speed detection section shown in FIG. 5.

Next, the rotation detect signal a from the photosensor 3 and the operation of the speed detector 71 will be described with reference to FIG. 7. The time intervals A, B, C and D each indicate the length of time required for the disk 1 to make one rotation. A1, B1, C1 and D1 are time intervals during which time the light-transmission portion 1c moves past the photosensor 3 and hence the signal a is high. A2, B2, C2 and D2 are time intervals during which time the light-shielding portion 1b moves past the photosensor 3 and hence the signal a is low.

When the pinhole disk 1 starts rotation, the counter (not shown) built in the speed detector 71 in the FPGA 7 starts to count the clock pulse signal e from the clock generator 8 on a rising edge (a–1) of the detect signal a. At the occurrence of the next rising edge (a–2), the speed detector outputs the count g in the counter, then resets and restarts the counter. The counter has a resolution of one period of the clock signal e. In this embodiment, since the clock signal has a frequency of 3.2768 MHz, the counter is operated at a time resolution of about 305 ns.

When the count g from the speed detector 71 corresponds to the frame frequency of the video signal b, the commander 72 recognizes that the rotation speed of the pinhole disk 1 has reached the target value. To be specific, since the frame frequency of the video signal b is 29.97 Hz and the counter in the speed detector 71 is operated at a time resolution of about 305 ns, the counter will count 109336 when the disk 1 makes 29.97 rotations per second in correspondence with the video frame frequency of 29.97 Hz. When the count g in the speed detector 71 reaches 109336, the commander 72 instructs, via the signal k, the brake signal controller 74 to switch into the mode in which a brake signal is output based on information from the phase deviation detector 73.

Further, the commander 72 outputs an enable signal i to the phase deviation detector 73 to cause it to detect the phase relationship between the ODD/EVEN identification signal c from the video sync separator 6 and the rotation detect signal a from the photo sensor 3.

The operation of the phase deviation detector 73 will be described below.

Upon receipt of the ODD/EVEN identification signal c, the phase deviation detector 73 operates its counter which starts a count operation on a falling edge of the identification signal c and restarts the next count operation on the next falling edge. The phase deviation detector 73 then stores counts in the counter at a rising edge of the ODD/EVEN identification signal c and a rising edge of the rotation detect signal a into memories A and B (not shown). Based on these counts in the memories A and B, the phase deviation detector 73 determines the phase relationship between the rising edges of the signals and calculates the difference between the counts and then sends to the brake signal controller 74 an acceleration/deceleration instruction signal j based on the phase relationship and a signal 1 indicating the count difference.

Figure 8A:
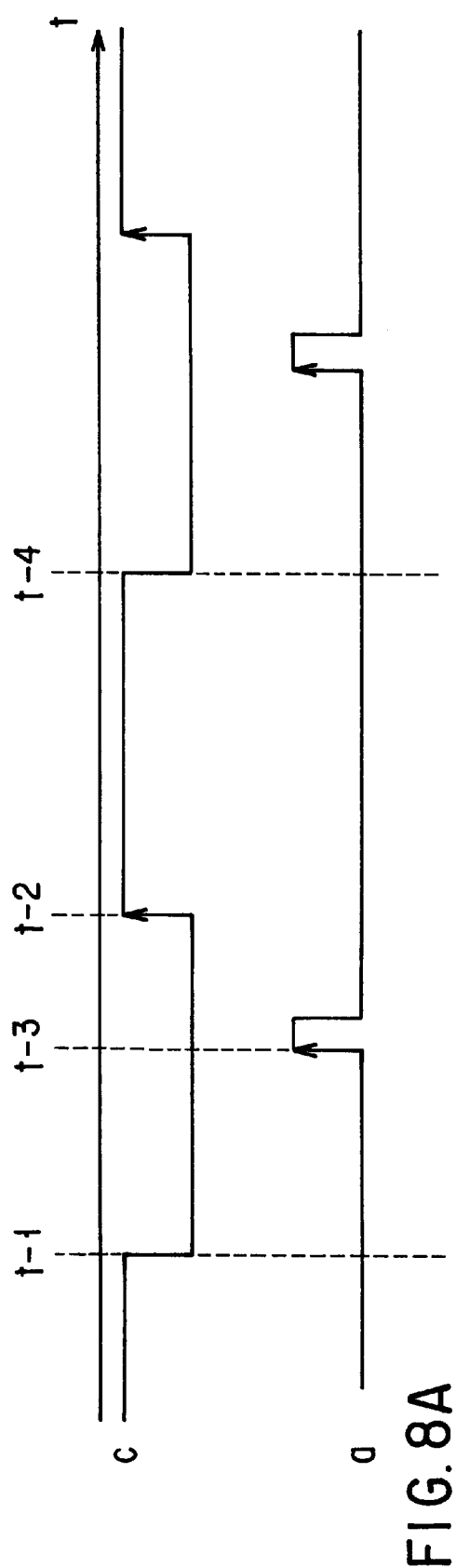
FIGS. 8A and 8B show relationships between the detected signal a and the ODD/EVEN identification signal in FIG. 2.
Figure 8B:
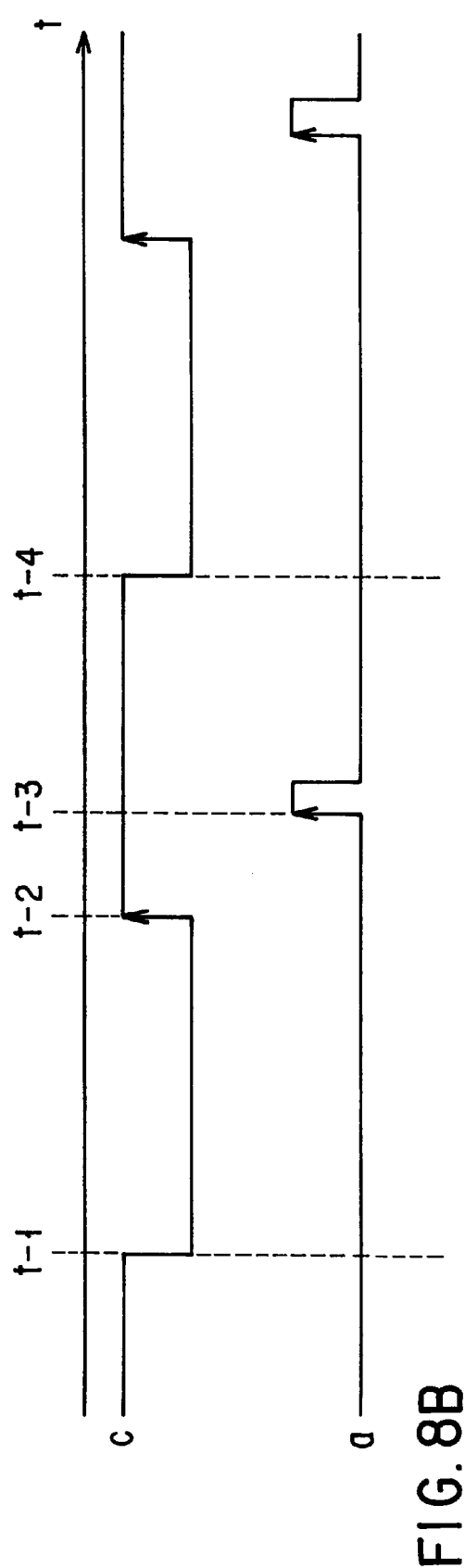

The relationships between the rotation detect signal a and the ODD/EVEN identification signal c in the operation of the phase deviation detector 73 are illustrated in FIGS. 8A and 8B. In the case of FIG. 8A, a rising edge (t–3) of the rotation detect signal a is advanced in phase with respect to a rising edge (t–2) of the ODD/EVEN identification signal c.

The phase deviation detector 73 starts its counter on the falling edge (t–1) of the ODD/EVEN identification signal c. Upon detecting the rising edge (t–3) of the rotation detect signal a, the detector 73 stores the count in the counter at that time into the memory B.

Upon detecting the rising edge (t–2) of the ODD/EVEN identification signal c, the phase deviation detector 73 loads the count in the counter at that time into the memory A. After loading the count, the amount of deviation between the rising edges is determined by calculating (memory A–memory B) and sent to the brake signal controller 74 as a signal 1. At the same time, the acceleration/deceleration signal j is set to low level to instruct the brake signal controller 74 to decelerate the DC motor 2.

In the case of FIG. 8B, the rising edge (t–2) of the signal c occurs earlier than the rising edge (t–3) of the signal a, indicating that the ODD/EVEN identification signal c is advanced in phase with respect to the rotation detect signal a. In this case, (memory B–memory A) is calculated, contrary to the case of FIG. 8A. The difference is sent to the brake signal controller 74 as the signal 1. At the same time, the acceleration/deceleration signal j is set to high level to instruct the brake signal controller 74 to accelerate the brushless DC motor 2.

Next, the brake signal d output from the brake signal controller 74 will be described.

As shown in FIG. 9A, the brake signal d is output at a frequency of about 20 kHz. The higher the frequency of the brake signal d, the more the vibration that is produced by turning on and off the currents in the stator coils can be reduced. However, setting the brake signal frequency too high results in failure of FETS in the motor driver 9 to follow, making it impossible to control the speed of the motor 2. In the present embodiment, therefore, the brake signal frequency is selected to be about 20 kHz, which is a frequency close to the upper limit under which the FETs can operate properly.

In FIGS. 9A through 9F, it is assumed that the brake signal d brakes the motor 2 at low level and releases the brake and accelerates the motor at high level.

The motor 2 has a characteristic such that it rotates at frequency close to 29.97 Hz which is the video frame frequency when the duty factor of the drive signal representing the percentage of high-level interval is 50% as shown in FIG. 9A. With such a brake signal as shown in FIG. 9B, the motor 2 starts deceleration because, even if the signal is 20 kHz in frequency, the interval when it is at low level, i.e., the interval of time during which the motor 2 is braked, is longer than in the case of FIG. 9A. In the case of FIG. 9C, the motor 2 is further decelerated because the braking time is longer than in FIG. 9B. In the case of FIG. 9D, in contrast to FIG. 9B, the braking time is set shorter than in FIG. 9A, so that the motor 2 is accelerated to rotate at a higher rate than 29.97 Hz. In the case of FIG. 9E, the braking time is set shorter than in FIG. 9D, allowing the motor 2 rotate at a higher speed.

The motor 2 used in this embodiment has a characteristic such that it rotates at about 3600 rpm (60.00 Hz) in the non-brake state, i.e., when the brake signal d is kept high constantly.

The operation of the brake signal controller 74 and the motor 2 will be described based on the aforementioned relationship between the brake signal d and the motor 2.

In the state shown in FIG. 8A, the rising edge (t–3) of the rotation detect signal a is advanced in phase with respect to the rising edge (t–2) of the ODD/EVEN identification signal c. The phase deviation detector 73 sets the acceleration/deceleration instruction signal j low to instruct the brake signal controller 74 to reduce the speed of the motor 2 and outputs the amount of deviation between both the edges as the signal 1.

In response to the signals j and 1, the brake signal controller 74 outputs such a brake signal d as shown in FIG. 9C in which the brake-on time is long, thereby decelerating the motor. As a result, the rising edge (t−3) of the rotation detect signal a starts to approach the rising edge (t−2) of the identification signal c. The phase deviation detector 73 performs the above processing each time the disk 1 makes one rotation.

As the rising edge (t−3) of the rotation detect signal a approaches the rising edge (t−2) of the ODD/EVEN identification signal c, the brake signal controller 74 reduces the rate of deceleration of the motor 2 by making the brake-on time of the brake signal d gradually shorter than in FIG. 9C as shown in FIG. 9B. In this manner, the rising edges of the rotation detect signal a are timed to occur simultaneously with those of the ODD/EVEN identification signal c.

In the even that the rising edge (t−3) of the rotation detect signal a was delayed in phase with respect to the rising edge (t−2) of the ODD/EVEN identification signal c due to excessive deceleration during the processing or when, as shown in FIG. 8B, the rotation detect signal a had already been delayed in phase with respect to the ODD/EVEN identification signal c at the start of control, the motor 2 is accelerated by setting the brake signal d as shown in FIGS. 9D or 9E. Thereby, the rotation detect signal a and the ODD/EVEN identification signal c are made in phase with each other.

If the rotation detect signal a is slightly displaced in phase from the ODD/EVEN identification signal c after they were once made in phase with each other and fine speed control is therefore required, then higher precise brake control is performed. Specifically, as shown in FIG. 9F, speed control is performed by changing the duty factor in some portions of a brake signal d whose duty factor in another portions is set at 50% as shown in FIG. 9A. This allows motor speed control which is very fine in comparison with the case where the brake-on time intervals are varied uniformly as shown in FIGS. 9B to 9E, since only part of the brake-on time intervals are varied. The motor speed control may be performed by varying the duty factor in all portions of the brake signal d as opposed to fixing the duty factor at 50% in some portions of the brake signal d as shown in FIG. 9F.

Thus, by varying the pulse width in the brake signal d the present embodiment eliminates the need of analog circuits for varying the rotation speed of the motor 2. Moreover, variations in the rotation speed of the motor 2 due to variations in torque can be reduced because the motor 2 is controlled by the on-off control of drive currents, not by changing the amplitude of the drive currents. Furthermore, since the speed control can be performed using one FPGA consisting of one semiconductor chip, the circuit arrangement is allowed to be simple and inexpensive.

Second Embodiment

A second embodiment of the present invention is a modification of the first embodiment and differs from the first embodiment only in the arrangement of the FPGA shown in FIG. 5.

Figure 10:
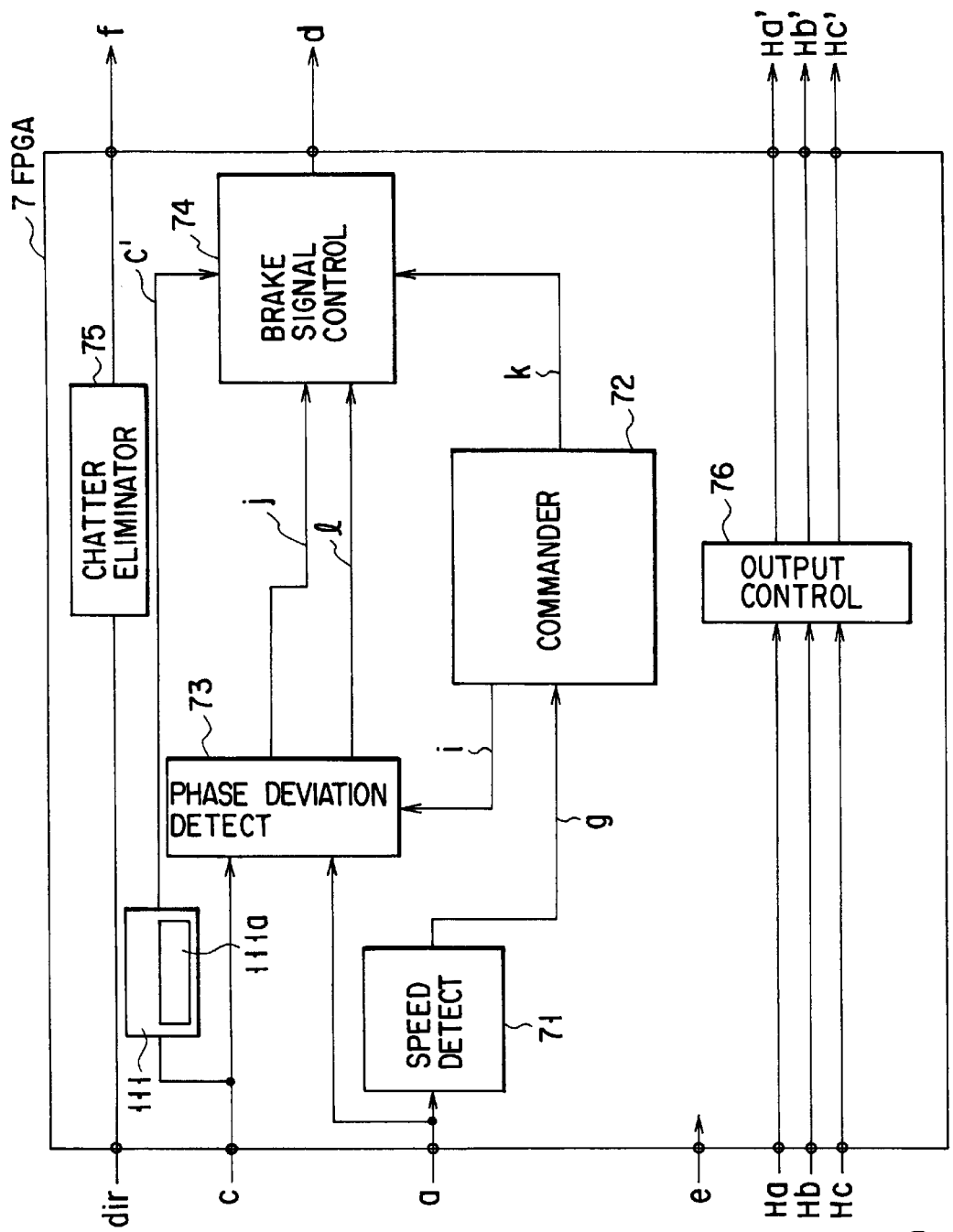
FIG. 10 is a block diagram of FPGA according to a second embodiment of the present invention.

FIG. 10 is a block diagram of the FPGA according to the second embodiment of the present invention. In the second embodiment, a brake signal frequency controller 111 is added to the arrangement of the FPGA shown in FIG. 5. The frequency controller 111 has a memory 111a built in, which stores samples or frequencies associated with various signal systems such as NTSC, PAL and so on. These frequencies are mapped into the frequencies of brake signals to be produced and stored in the form of a table, for example in FIG. 11.

The brake signal frequency controller 111 is connected to receive an ODD/EVEN identification signal c output from the video sync separator 6 and identifies the signal system (NTSC, PAL, or the like) with which the signal c is associated. The controller 111 then sends to the brake signal controller 74 a brake signal frequency decision signal c' as a command to select the brake signal frequency corresponding to the identified signal system.

Figures 11, 15:
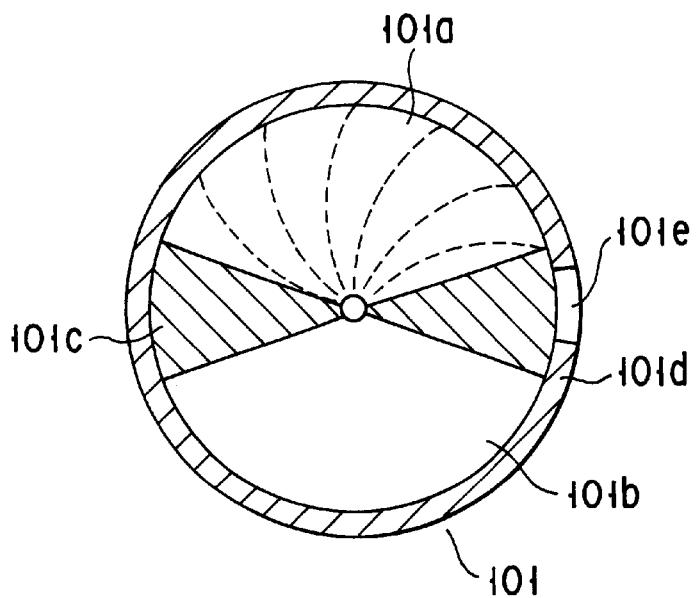
FIG. 11 shows a data table stored in a memory in the second embodiment.
FIG. 15 shows a modification of the pinhole disk that may be made in the present invention.

Thus, the brake signal frequency controller 111 identifies the frequency of the signal c from the CCD camera 4 side and the brake signal frequency controller 74 produces the corresponding brake signal. This arrangement allows the speed control of the pinhole disk 1 to be performed to conform to CCD cameras based on various signal systems. In the present embodiment, the frequencies of signals c are mapped into the frequencies of signals c' in the one-to-one relationship as shown in FIG. 11; however, this is not restrictive. For example, a function for converting the signals c into the signals c' may be determined and then stored in the memory 111a. The use of such a function allows a brake signal to be produced to conform to any one of the signal systems.

Third Embodiment

A third embodiment relates to an application of the present invention to a centrifugal microscope.

Figure 12A:
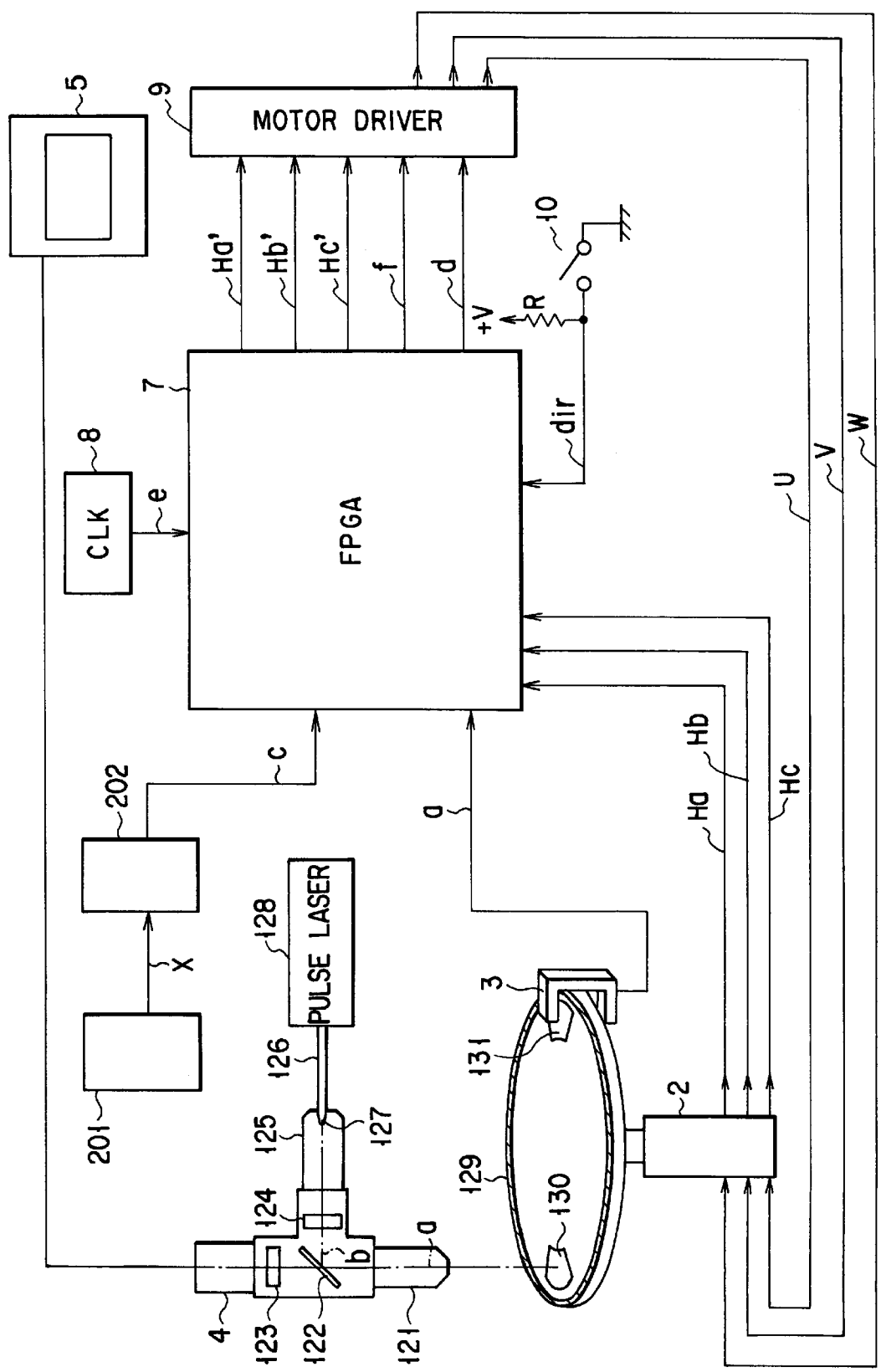
FIG. 12A is a schematic illustration of a centrifugal microscope according to a third embodiment of the present invention.

FIG. 12A is a schematic illustration of a centrifugal microscope to which the present invention is applied. As shown, the microscope of the present embodiment adopts an incident-light observation system. That is, a half mirror 122 and an analyzer 123 are placed on the optical axis a of an objective lens 121. A half mirror 122 and a polarizer 124, a beam expander 125 and the light outputting end 127 of an optical fiber 126 are arranged on the optical axis b perpendicular to the optical axis a. The optical fiber 126 has its other end connected to a pulse laser 128. In this manner, an optical system for incident-light polarization observation is arranged.

A disk 129 is placed below the objective lens 121. with the rotation of the disk 129, a specimen chamber 130 crosses the optical axis a of the objective lens 121. At the time when the specimen chamber 130 crosses the optical axis a of the objective lens 121 (the time is controlled by a timing control circuit [not shown]), the pulse laser 128 emits a beam of laser light in a direction parallel to the optical axis b. The beam of laser light is directed toward the polarizer 124 and the half mirror 122.

The half mirror 122 may be replaced with a pair of mirrors, a bake prism, or the like.

A dummy chamber 131 is arranged in the position that is symmetrical with the specimen chamber 130 with respect to the axis of rotation of the disk 129. Owing to the symmetrical arrangement between the specimen chamber 130 and the dummy chamber 131, the stability of rotation of the disk 129 is ensured even when this disk 129 rotates at high speed.

The third embodiment employs a speed designator 201. This enables the rotating speed of the disk 129 to be set at a desirable value. To be more specific, the speed designator 201 is provided with a DIP switch (not shown), and the rotating speed can be varied in 64 steps. The rotating speed determined by this switch is expressed by a 6-bit signal x, and this 6-bit signal x is supplied to a speed signal generating circuit 202.

The speed signal generating circuit 202 is provided with a disk rotating speed table, in which 6-bit signals x are correlated with specific rotating speeds. For example, when decimal number "32" is entered from the speed designator 201, the table shows that the value corresponding thereto is decimal "100." This value is used as the rotating speed (rotations/second) of the disk 129. That is, a diving signal of 100 Hz is generated and output as signal c. FIG. 12B shows the signal c.

In the manner described above, the third embodiment employs an FPGA similar to that of the first embodiment, and the period of rotation of the brushless DC motor 2 is controlled by executing digital signal processing similar to that of the first embodiment.

FIGS. 12C and 12D shows a state where the rotating speed of the disk 129 corresponds to the speed designated by the speed designator 201. FIG. 12C shows the signal c, and FIG. 12D shows the signal a corresponding to the signal c in FIG. 12C.

Owing to the features described above, the third embodiment provides a centrifugal microscope that can set a desirable rotating speed only by using a simple circuit mechanism.

Fourth Embodiment

The application of the present invention is not limited to a rotating body of the type described above, and is applicable to the RGB disk of a CCD camera, which forms a colored image by a field-sequential system.

Figure 13:
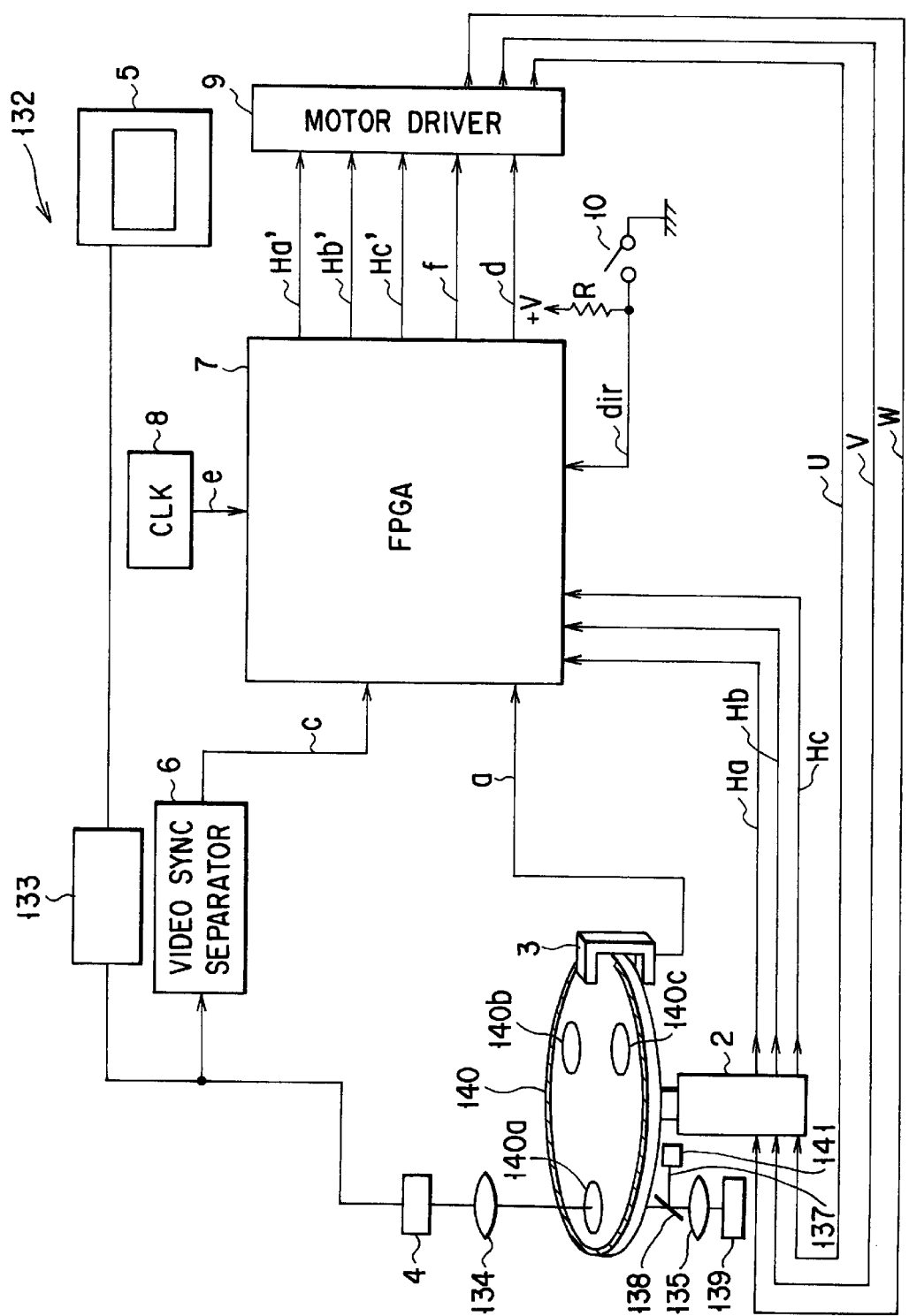
FIG. 13 is a schematic illustration of an endoscope according to a fourth embodiment of the present invention.

The field-sequential system using the RGB disk will be described in detail, with an image detecting apparatus shown in FIG. 13 being taken as an example. Like reference numerals are used to denote corresponding components to those in the first embodiment, and detailed descriptions of such components will be omitted.

The image detecting apparatus 132 comprises a lamp 141 for emitting illumination light 137, a half mirror 138 for deflecting the illuminating light 137, emitted from the lamp 141, toward an object 139, an objective lens 135 for condensing the illumination light 137 deflected by the half mirror 138 on the objective lens 135, and a CCD camera 4 for detecting an image from the object 139. The CCD camera 4 detects the image by means of an half mirror 138, an RGB disk 140 (to be detailed below) and an imaging lens 134.

The RGB disk 140 is arranged on the optical axis of the illumination light 137, and is rotatable by a brushless DC motor 2.

A detailed structure of this RGB disk 140 is shown in FIG. 14A.

As shown in FIG. 14A, an R filter 140a, a G filter 140b and a B filter 140c are arranged in such a manner that they are 120° away from each other with respect to the center of rotation of the RGB disk 140. These filters 140a to 140c allow passage of light beams of different wavelengths.

The circumference of the RGB disk 140 is made of three light-shielding portions 140d (i.e., light-shielding portions) and three light-transmission portions 140e (i.e., a light-transmission portion). Like the filters, the light-shielding portions 140d are arranged to be 120° away from each other, and so are the light-transmission portions 140e.

Of the disk's inside area, those portions other than the filters 140a to 140c serve as a light-shielding portion 140f.

Images of the object 139 are captured by a CCD camera 4 by receiving light beams incident thereon through the filters 140a to 140c. The images are intermittent in time series.

The signal lines of the CCD camera 4 are connected to both a video SYNC separator 6 and an image synthesizer 133. The image synthesizer 133 can synthesize images captured in time series.

The rotation of the RGB disk 140 is controlled in such a manner that the image capturing period of the CCD camera 4 and the time at which the light-transmission portion 140e of the RGB disk 140 passes by a light detection element are synchronous with each other.

The state of synchronization is shown in FIG. 14B and 14C. FIG. 14B shows the signal c, and FIG. 14C shows the signal a corresponding to the signal c. Images captured by the CCD camera 4 are supplied to the image synthesizer 133. By this image synthesizer, the three images captured in time series are synthesized as an RGB colored image of the object 139.

In the image detecting apparatus 132 described above, the light-shielding and light-transmission portions 140d and 140e at the circumference of the RGB disk 140 are utilized to perform motor control similar to that of the first embodiment. As in the first embodiment, therefore, the video signal and the rotation speed of the disk are synchronized without being adversely affected by noise or torque variations.

The present invention is not restricted to the aforementioned embodiments. Although the embodiments have been described in terms of a confocal or centrifugal microscope, the present invention is applicable to any apparatus that captures images in synchronization with the rotation of a rotating body.

In the embodiments, as a pinhole disk use is made of a disk in which pinholes are formed inside in the form of spirals. This is not restrictive. Since the CCD camera and the disk are synchronized with each other not only with respect to speed but also with respect to position on the disk, such a pinhole disk as shown in FIG. 15 can be used. This pinhole disk 101 has a pinhole portion 101a and a window portion 101b formed in opposite positions. The disk is further formed with light-shielding portions 101c and 101d between the pinhole portion and the window portion. In the pinhole portion 101a, pinholes are formed to spiral outwards from the disk center. The pinholes are arranged to allow illumination light to illuminate uniformly a specimen when the disk rotates to scan the specimen.

The disk 101 is further formed at outer edge with a light-transmission portion 101e and an light-shielding portion 101f, allowing a photosensor to detect the rotation as with the disk 1.

The use of this disk 101 in speed control allows the CCD camera to capture an image corresponding to the pinhole portion 101a, i.e., a confocal image, in the even field of one frame of picture and an image corresponding to the window portion 101b, i.e., an bright field image, in the odd field. By performing image processing as separates the even and odd fields of one frame of picture, the confocal image and the bright field image will be displayed simultaneously on the monitor.

The present invention is also applicable to apparatus in which a first disk is formed with a pinhole portion and a window portion, and a second disk formed with a light-transmission portion and a reflective portion is placed in the optical path from which the confocal image obtained through the first disk is viewable. In this case, a confocal image obtained through the pinhole portion of the first disk is allowed to pass through the light-transmission portion of the first disk and then captured by a first CCD camera. A non-confocal image obtained through the window portion of the first disk is reflected by the reflective portion of the second disk and then captured by a second CCD camera. Each of the first and second disks is formed at its outer edge with a light-transmission portion and an light-shielding portion as with the aforementioned disks. The motors for rotating the first and second disks are synchronized with the first and second CCD cameras. This arrangement remains unchanged in effectiveness from the aforementioned embodiments.

In the present invention, the disk configuration is not restrictive. In addition to the disk configurations described so far, any other configuration can be used. For example, pinholes may be arranged randomly. Further, line patterns may be formed instead of pinhole patterns.

Moreover, the disk need not be of a flat type but may be formed in the shape of a cylinder. In this case, a large number of pinholes are formed in the circular planes of the cylinder.

According to the present invention, as described above, since motor speed control is performed by making the pulse width of the brake signal variable, there is no need to use analog circuits. Thus, the disk can be synchronized with the camera without suffering from noise and motor torque variations resulting from changing the amplitude of motor drive currents.

In addition, by allowing a brake signal to have a pulse-width-variable portion and a pulse-width-fixed portion in selected portions thereof, very fine motor speed control can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image detecting apparatus comprising:
  a rotating body having a light-transmission pattern;
  rotating state detecting mechanism producing a signal indicative of the rotating state of the rotating body;
  image capture mechanism capturing an image transmitted through the light-transmission pattern and providing an image signal;
  a motor mounted to the rotating body for rotating the rotating body at a given speed;
  a motor driver for driving the motor; and
  a motor controller responsive to the rotating state detecting mechanism outputting, to the motor driver, a pulse-like brake signal for synchronizing the rotation of the motor with the image capture timing of the image capture mechanism, the brake signal having two levels for accelerating and decelerating the motor and its pulse width set variable.

2. The image detecting apparatus according to claim 1, wherein the image transmitted through the light-transmission pattern of the rotating body is a confocal image.

3. The image detecting apparatus according to claim 1, wherein the motor controller has pulse width varying mechanism producing a pulse signal of a predetermined frequency and allowing the pulse signal to have a portion in which the pulse width is fixed at a given value and a portion in which the pulse width differs from the given value in selected portions thereof.

4. The image detecting apparatus according to claim 1, further comprising a phase relationship detector for detecting the phase difference between the image signal and the signal indicative of the rotating state of the rotating body and outputting it to the motor controller.

5. The image detecting apparatus according to claim 1, further comprising a brake signal controller responsive to the frequency of the image signal for varying the frequency of the brake signal.

6. The image detecting apparatus according to claim 1, further comprising a brake signal frequency controller responsive to the frequency of the image signal for varying the frequency of the brake signal, the brake signal frequency controller having a memory in which image signal frequencies are mapped into brake signal frequencies.

7. The image detecting apparatus according to claim 1, further comprising a phase relationship detector for detecting the phase difference between the image signal and the signal indicative of the rotating state of the rotating body and outputting it to the motor controller, the phase relationship detector and the motor controller being manufactured into a single chip of semiconductor.

8. The image detecting apparatus according to claim 1, wherein the light-transmission pattern is configured to selectively transmit light in at least two wavelength regions of the spectrum.

9. An image detecting apparatus comprising:
  a rotating body having a reflective pattern;
  rotating state detecting mechanism outputting the rotating state of the rotating body;
  image capture mechanism capturing an image reflected from the reflective pattern;
  a motor mounted to the rotating body for rotating the rotating body at a given speed;
  a motor driver for driving the motor; and
  a motor controller responsive to the rotating state detecting mechanism outputting, to the motor driver, a pulse-like brake signal for synchronizing the rotation of the motor with the image capture timing of the image capture mechanism, the brake signal having two levels for accelerating and decelerating the motor and its pulse width set variable.

10. The image detecting apparatus according to claim 9, wherein the motor controller has pulse width varying mechanism producing a pulse signal of a predetermined frequency and allowing the pulse signal to have a portion in which the pulse width is fixed at a given value and a portion in which the pulse width differs from the given value in selected portions thereof.

11. The image detecting apparatus according to claim 9, further comprising a phase relationship detector for detecting the phase difference between an image signal from the image capture mechanism and a signal indicative of the rotating state of the rotating body and outputting it to the motor controller.

12. The image detecting apparatus according to claim 9, further comprising a brake signal controller responsive to the frequency of an image signal from the image capture mechanism varying the frequency of the brake signal.

13. The image detecting apparatus according to claim 9, further comprising a brake signal frequency controller responsive to the frequency of an image signal from the image capture mechanism varying the frequency of the brake signal, the brake signal frequency controller having a memory in which image signal frequencies are mapped into brake signal frequencies.

14. The image detecting apparatus according to claim 9, further comprising a phase relationship detector for detecting the phase difference between an image signal from the image capture mechanism and a signal indicative of the rotating state of the rotating body and outputting it to the motor controller, the phase relationship detector and the motor controller being manufactured into a single chip of semiconductor.

15. The image detecting apparatus according to claim 9, wherein the reflective pattern is a specimen to be observed, the specimen being subjected to centrifugation by the rotation of the rotating body.

16. An image detecting method comprising the steps of:

rotating a rotating body at a given speed;

capturing an image obtained through the rotating body by image capture mechanism;

controlling the rotating state of the rotating body by a motor controller; and outputting, to the motor controller, a brake signal for synchronizing the rotation of the motor with the image capture timing of the image capture mechanism, the brake signal having two levels for accelerating and decelerating the motor and its pulse width set variable.

17. An image detecting method comprising the steps of:

capturing an image obtained through a rotating body at predetermined image capturing timings, said rotating body being rotated at a given speed;

controlling a rotating state of the rotating body by a motor controller; and controlling the rotating state of the rotating body and the image capturing timing by supplying the motor controller with a binary brake signal, said brake signal having two levels for switching the rotating body between a rotation control state and a non rotation control state and being variable in pulse width, whereby the rotating body is allowed to rotate at a desirable rotating speed.

* * * * *